United States Patent
Cho et al.

(10) Patent No.: US 9,549,308 B2
(45) Date of Patent: Jan. 17, 2017

(54) APPARATUSES AND METHODS FOR SELECTION AMONG MULTIPLE SUBSCRIBER NUMBERS

(71) Applicant: MediaTek Inc., Hsin-Chu (TW)

(72) Inventors: Te-Chung Cho, Taichung (TW); Yu-Ting Chen, Meishan Township, Chiayi County (TW); Tao-Sheng Ou, Taoyuan (TW); Che-Cheng Lin, Taipei (TW); Jen-De Lai, New Taipei (TW)

(73) Assignee: MEDIATEK INC., Hsin-chu (TW)

( * ) Notice: Subject to any disclaimer, the term of this patent is extended or adjusted under 35 U.S.C. 154(b) by 0 days.

(21) Appl. No.: 14/584,354

(22) Filed: Dec. 29, 2014

(65) Prior Publication Data

US 2016/0192170 A1    Jun. 30, 2016

(51) Int. Cl.
*H04W 4/26* (2009.01)
*H04W 4/20* (2009.01)
*H04M 15/00* (2006.01)
*H04M 3/42* (2006.01)

(52) U.S. Cl.
CPC .................. *H04W 4/26* (2013.01); *H04M 3/42* (2013.01); *H04M 15/8055* (2013.01); *H04W 4/20* (2013.01); *H04M 15/887* (2013.01)

(58) Field of Classification Search
CPC .......... H04W 4/24; H04W 48/18; H04W 4/26; H04W 4/001; H04M 17/00; H04M 17/10; H04M 17/103; H04M 15/8044; H04M 15/8055; H04M 15/8061; H04M 15/8214; H04M 15/88; H04M 15/886; H04M 15/887

See application file for complete search history.

(56) References Cited

U.S. PATENT DOCUMENTS

2010/0311404 A1* 12/2010 Shi ........................ H04W 8/205
455/419

FOREIGN PATENT DOCUMENTS

CN    101400181    4/2009

* cited by examiner

*Primary Examiner* — Nam Huynh
(74) *Attorney, Agent, or Firm* — McClure, Qualey & Rodack, LLP (57) ABSTRACT

A mobile communication device is provided with a processor. The processor is configured to receive a request for starting a Mobile Originated (MO) service, determine a plurality of remaining usage quotas for the MO service, which correspond to a plurality of subscriber numbers, and select one of the subscriber numbers for starting the MO service according to the remaining usage quotas.

12 Claims, 10 Drawing Sheets

| Callee - CHT | Caller subscriber number #01 - CHT | Caller subscriber number #02 - FET |
|---|---|---|
| remaining in-net call credits | 0 | NA |
| remaining out-net call credits | NA | 200 NT dollars ✓ |
| in-net rate of charge | 5 NT dollars per minute | NA |
| out-net rate of charge | NA | 10 NT dollars per minute |
| available talk time | 0 minute | 20 minutes ✓ |

FIG. 6

| Callee - CHT | Caller subscriber number #01 - CHT | Caller subscriber number #02 - FET |
|---|---|---|
| remaining in-net anytime minutes | 0 minute | NA |
| remaining out-net anytime minutes | NA | 200 minutes ✓ |
| in-net rate of charge | 5 NT dollars per minute | NA |
| out-net rate of charge | NA | 10 NT dollars per minute |

FIG. 7

| PS service | Caller subscriber number #01 - CHT | Caller subscriber number #02 - FET |
|---|---|---|
| remaining PS service credits | 0 MB | 500 MB ✓ |
| rate of charge | 5 NT dollars per MB | 10 NT dollars per MB |

FIG. 8

| Callee - CHT | Caller subscriber number #01 - CHT | Caller subscriber number #02 - FET |
|---|---|---|
| remaining in-net call credits | 100 NT dollars | NA |
| remaining out-net call credits | NA | 300 NT dollars ✓ |
| in-net rate of charge | 5 NT dollars per minute | NA |
| out-net rate of charge | NA | 10 NT dollars per minute |
| available talk time | 20 minute | 30 minutes ✓ |

FIG. 9

| Callee - CHT | Caller subscriber number #01 - CHT | Caller subscriber number #02 - FET |
|---|---|---|
| remaining in-net call credits | 100 NT dollars | NA |
| remaining out-net call credits | NA | 200 NT dollars |
| in-net rate of charge | 5 NT dollars per minute ✓ | NA |
| out-net rate of charge | NA | 10 NT dollars per minute |
| available talk time | 20 minute | 20 minutes |

FIG. 10

APPARATUSES AND METHODS FOR SELECTION AMONG MULTIPLE SUBSCRIBER NUMBERS

BACKGROUND OF THE INVENTION

Field of the Invention

The invention generally relates to mobile phone technologies, and more particularly, to apparatuses and methods for selection among multiple subscriber numbers.

Description of the Related Art

With growing demand for ubiquitous computing and networking, various wireless technologies have been developed, such as the Global System for Mobile communications (GSM) technology, General Packet Radio Service (GPRS) technology, Enhanced Data rates for Global Evolution (EDGE) technology, Wideband Code Division Multiple Access (W-CDMA) technology, Interim Standard 95 (IS-95) technology, Code Division Multiple Access 2000 (CDMA 2000) technology, CDMA 2000 1× Evolution-Data Optimized or Evolution-Data (CDMA2000 1× EV-DO) technology, Time Division-Synchronous Code Division Multiple Access (TD-SCDMA) technology, Worldwide Interoperability for Microwave Access (WiMAX) technology, Long Term Evolution (LTE) technology, Time-Division LTE (TD-LTE) technology, LTE-Advanced (LTE-A) technology, and others.

Generally, a cellular phone only supports one wireless technology with one subscriber number for providing users with the flexibility of mobile communications at all times via the supported wireless technology using the single subscriber number. However, to an increasing extent, more and more people find having an additional subscriber number to be a good way to reduce their mobile service charges (including voice and/or data services), or to separate personal and business phone calls. In order to alleviate the burden of carrying two cellular phones for two separate subscriber numbers, so-called dual-number cellular phones have been developed, which generally support two wireless technologies for respective mobile services using an individual subscriber number. The dual-number design allows both wireless technologies to be active simultaneously and allows calls to be made or received on either subscriber number at any time.

Since mobile services obtained using different subscriber numbers are billed separately, an issue of budget management arises concerning how to select from the multiple subscriber numbers for conducting a certain mobile service. For example, each subscriber number is associated with an individual service contract which typically includes a monthly charge, rates of service charges for different mobile services (e.g., calls made within the same network, calls made across different networks, Short Message Service (SMS), and data service, etc.), time periods in which different rates are charged (e.g., the rate during the midnight hours is lower than the rate during the day time), and a usage quota that is included in the contract for the monthly charge (e.g., anytime minutes or credits, such as call credits, SMS credits, Packet-Switched (PS) service credits), etc. Specifically, said calls may include general voice calls and Video-Telephony (VT) calls which provide verbal and visual communications between or among end users. Nonetheless, most practices of budget management for dual-number cellular phones only take into account the rates of service charges and time periods of the plurality of subscriber numbers. That is, the mobile services are obtained using the subscriber number with the lowest rate of service charge in the designated time period, despite the chance that there may be another subscriber number with remaining usage quota.

Therefore, it is desirable to have a more cost-effective way of budget management that can take into account the remaining usage quotas of multiple subscriber numbers when selecting one of the subscriber numbers for obtaining mobile services.

BRIEF SUMMARY OF THE INVENTION

In one aspect of the invention, a mobile communication device comprising a processor is provided. The processor is configured to receive a request for starting a Mobile Originated (MO) service, determine a plurality of remaining usage quotas for the MO service, which correspond to a plurality of subscriber numbers, and select one of the subscriber numbers for starting the MO service according to the remaining usage quotas.

In another aspect of the invention, a method for selection among multiple subscriber numbers in a mobile communication device is provided. The method comprises the steps of: receiving a request for starting a Mobile Originated (MO) service; determining a plurality of remaining usage quotas for the MO service, which correspond to a plurality of subscriber numbers; and selecting one of the subscriber numbers for starting the MO service according to the remaining usage quotas.

Other aspects and features of the present invention will become apparent to those with ordinarily skill in the art upon review of the following descriptions of specific embodiments of the mobile communication devices and the methods for selection among multiple subscriber numbers in a mobile communication device.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Figure 1:
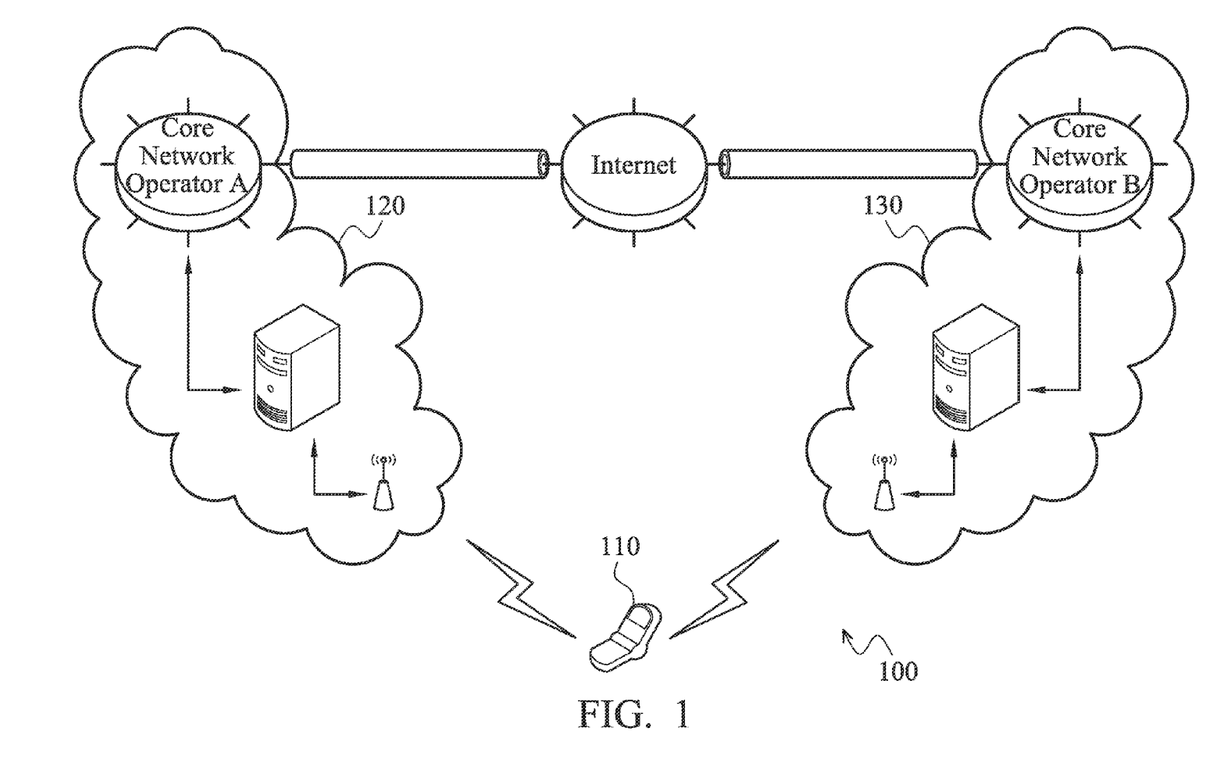
FIG. 1 is a block diagram illustrating a wireless communications environment according to an embodiment of the invention.

FIG. 1 is a block diagram illustrating a wireless communications environment according to an embodiment of the invention. The wireless communications environment 100 comprises a mobile communication device 110, and service networks 120 and 130. The mobile communication device 110 may wirelessly communicate with the service networks 120 and 130 with two separate subscriber numbers, after camping on two cells. The cell may be managed by a node-B, a base station (BS), an advanced BS (ABS), an enhanced BS (EBS), or others. The service networks 120 and 130 may be in compliance with any two of the GSM/GPRS/EDGE, WCDMA, IS-95, CDMA 2000, CDMA2000 1× EV-DO, TD-SCDMA, WiMAX, LTE, TD-LTE, LTE-A, and other wireless technologies, and the invention is not limited thereto. The subscriber numbers may be provided by two separate single-mode subscriber identity cards in compliance with the specifications of the technologies employed by the service networks 120 and 130. For example, the service network 120 may be a GSM/GPRS/EDGE system, and correspondingly, one of the single-mode subscriber identity cards may be a Subscriber Identity Module (SIM) card, while the service network 130 may be a WCDMA, LTE, TD-LTE, or LTE-A system and correspondingly, the other one of the single-mode subscriber identity cards may be a Universal SIM (USIM) card. Alternatively, the service network 120 may be a IS-95, CDMA 2000, CDMA2000 1× EV-DO system and correspondingly, one of the single-mode subscriber identity cards may be a Removable User Identity Module (R-UIM) card, while the service network 130 may be a TD-SCDMA system and correspondingly, the other one of the single-mode subscriber identity cards may be a CDMA subscriber Identity Module (CSIM) card. Alternatively, the subscriber numbers may be provided by a dual-mode subscriber identity card in compliance with the specifications of the technologies employed by the service networks 120 and 130. For example, both of the service networks 120 and 130 may be a WCDMA, LTE, TD-LTE, or LTE-A system, and correspondingly, the dual-mode subscriber identity card may be a USIM card holding two sets of subscriber information, including the subscriber numbers.

The mobile communication device 110 may obtain mobile services, including Circuit-Switched (CS) and Packet-Switched (PS) services, from the service networks 120 and 130, wherein the CS services includes voice services, VT calls, and SMS, etc., and the PS services include data services, such as e-mail transmission, web browsing, file upload/download, instant messaging, streaming video, voice over IP (VOIP), or others. In addition, a computer host, notebook, or panel PC may connect/couple to the mobile communication device 110 and wirelessly access Internet resources therethrough.

Figure 2:
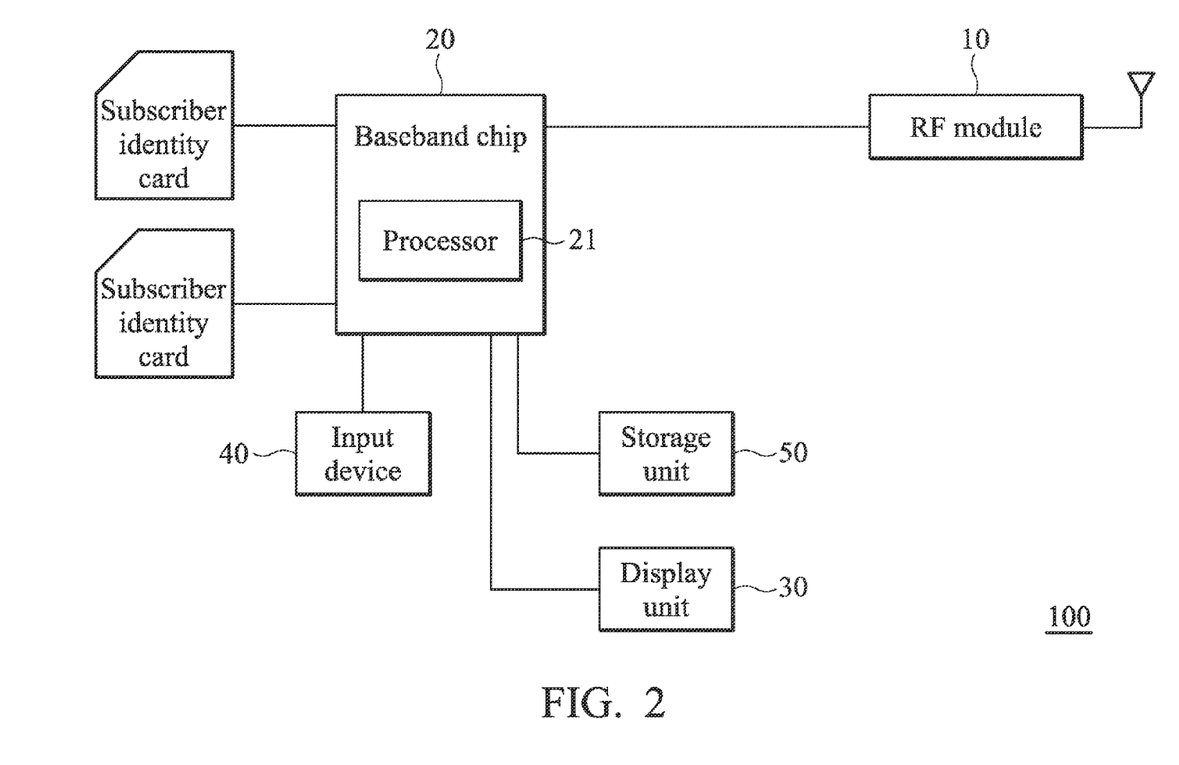
FIG. 2 is a block diagram illustrating the mobile communication device 110 according to an embodiment of the invention.

FIG. 2 is a block diagram illustrating the mobile communication device 110 according to an embodiment of the invention. The mobile communication device 110 comprises a Radio Frequency (RF) module 10, a Baseband chip 20, a display unit 30, an input device 40, and a storage unit 50, wherein the RF module 10, the display unit 30, the input device 40, and the storage unit 50 are coupled to the Baseband chip 20. The Baseband chip 20 comprises a processor 21 for controlling the communications between two single-mode subscriber identity cards and the RF module 10, sending a series of frame data (e.g. representing text messages, graphics, images or others) to the display unit 30, receiving signals from the input device 40, and storing and retrieving data to and from the storage unit 50. Most importantly, the processor 21 coordinates the above mentioned operations of the RF module 10, the display unit 30, the input device 40, and the storage unit 50 for performing the method for selection among multiple subscriber numbers in the invention.

Additionally, the Baseband chip 20 may further contain other hardware components to perform baseband signal processing, including Analog-to-Digital Conversion (ADC)/Digital-to-Analog Conversion (DAC), gain adjusting, modulation/demodulation, encoding/decoding, and so on. The RF module 10 may receive RF wireless signals via the antenna, convert the received RF wireless signals to baseband signals, which are processed by the Baseband chip 20, or receive baseband signals from the Baseband chip 20 and convert the received baseband signals to RF wireless signals, which are later transmitted via the antenna. The RF module 10 may also contain multiple hardware devices to perform radio frequency conversion. For example, the RF module 10 may comprise a mixer to multiply the baseband signals with a carrier oscillated in the radio frequency of the supported wireless technology, wherein the radio frequency may be 900 MHz, 1800 MHz or 1900 MHz utilized in GSM/GPRS/EDGE technology, or may be 900 MHz, 1900 MHz or 2100 MHz utilized in WCDMA technology, or may be 900 MHz, 2100 MHz, or 2.6 GHz utilized in LTE/LTE-A/TD-LTE technology, or others, depending on the wireless technology in use.

The single-mode subscriber identity cards may be plugged into two sockets (not shown) of the mobile communication device 110 for providing two separate subscriber numbers. Each of the single-mode subscriber identity cards may be a SIM, USIM, R-UIM or CSIM card, which is provided by a particular network operator. In another embodiment, one dual-mode subscriber identity card, instead of two single-mode subscriber identity cards, may be plugged into a socket of the mobile communication device 110 for providing two separate subscriber numbers. Alternatively, a single-mode subscriber identity card and a dual-mode subscriber identity card, or two dual-mode subscriber identity cards may be plugged into two sockets of the mobile communication device 110 for providing more than two subscriber numbers, or the subscriber number(s) may be directly written into the mobile communication device 110, without the need for any socket to insert any subscriber identity card, or the subscriber number(s) may be provided by a virtual subscriber identity card, and the invention is not limited thereto.

In one embodiment, the Baseband chip 20 may further comprise two interfaces (not shown) to handle the connections to the subscriber identity cards. In another embodiment, the mobile communication device 110 may further comprise a dual-card controller (not shown) coupled or connected between the Baseband chip 20 and the subscriber identity cards. The dual-card controller is responsible for powering the subscriber identity cards with the same or different voltage levels according to requirements thereof by a Power Management Integrated Chip (PMIC) and a battery, wherein the voltage level for each subscriber identity card is determined during initiation. The Baseband chip 20 may read data from one of the subscriber identity cards at a given time, and write data to one of the subscriber identity cards via the dual-card controller at a given time. In addition, the dual-card controller selectively transfers clocks, resets, and/or data signals to the subscriber identity cards according to instructions issued by the Baseband chip 20.

The display unit 30 may be a Liquid Crystal Display (LCD), Light-Emitting Diode (LED) display, or Electronic Paper Display (EPD), etc., for providing a display function. Alternatively, the display unit 30 may further comprise one or more touch sensors disposed thereon or thereunder for sensing touches, contacts, or approximations of objects, such as fingers or styluses.

The input device 40 may comprise one or more buttons, a keyboard, a mouse, a touch pad, a video camera, a microphone, and/or a speaker, etc., serving as the Man-Machine Interface (MMI) for interaction with users.

The storage unit 50 may be a memory, such as a FLASH memory or a Non-volatile Random Access Memory (NVRAM), or a magnetic storage device, such as a hard disk or a magnetic tape, or an optical disc, or any combination thereof for storing communication data for the Baseband chip 20 and/or storing subscriber data read from the subscriber identity cards.

Figure 3:
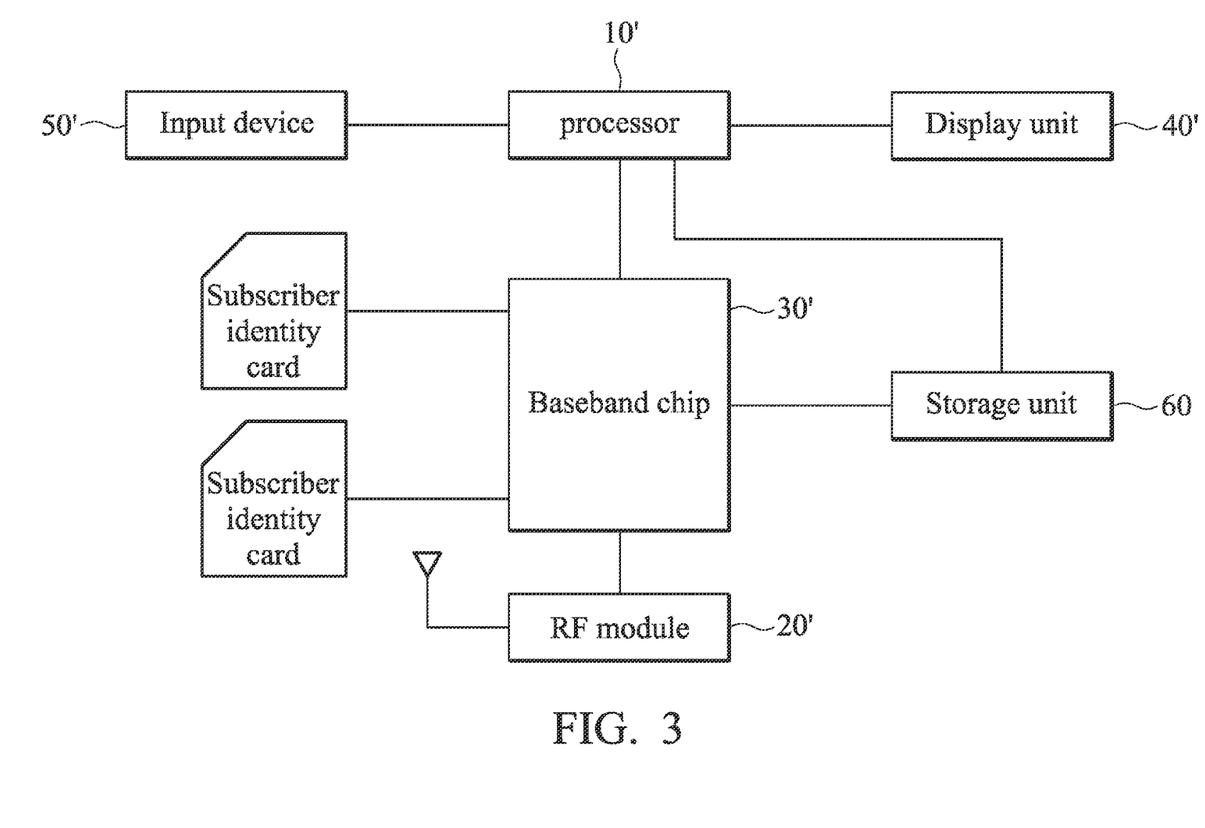
FIG. 3 is a block diagram illustrating the mobile communication device 110 according to another embodiment of the invention.

FIG. 3 is a block diagram illustrating the mobile communication device 110 according to another embodiment of the invention. The mobile communication device 110 comprises a processor 10', a Radio Frequency (RF) module 20', a Baseband chip 30', a display unit 40', an input device 50', and a storage unit 60, wherein the RF module 20' and the storage unit 60 are coupled to the Baseband chip 30', and the Baseband chip 30', the display unit 40', the input device 50', and the storage unit 60 are coupled to the processor 10'. The processor 10' may be a general-purpose processor, an application processor, a Digital Signal Processor (DSP), or others, for controlling the Baseband chip 30' for wireless communications with the service networks 120 and 130, sending a series of frame data (e.g. representing text messages, graphics, images or others) to the display unit 40', receiving signals from the input device 50', and storing and retrieving data to and from the storage unit 60. Most importantly, the processor 10' coordinates the above-mentioned operations of the Baseband chip 30', the display unit 40', the input device 50', and the storage unit 60 for performing the method for selection among multiple subscriber numbers in the invention. The detailed description of the RF module 20', the Baseband chip 30', the display unit 40', the input device 50', and the storage unit 60 is similar to the embodiment of FIG. 2, and thus, is omitted herein for brevity.

Figure 4A:
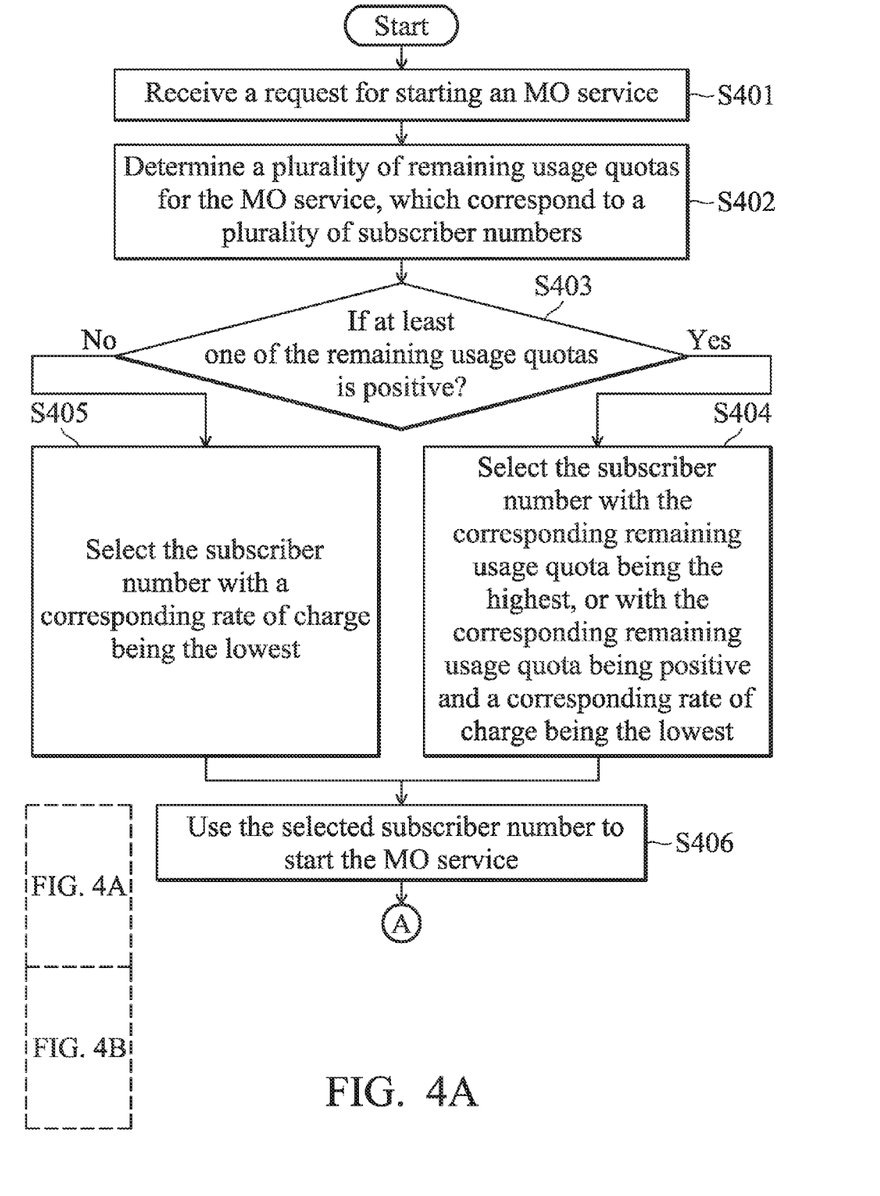
FIGS. 4A and 4B show a flow chart illustrating the method for selection among multiple subscriber numbers in a mobile communication device to start a Mobile Originated (MO) service according to an embodiment of the invention.
Figure 4B:
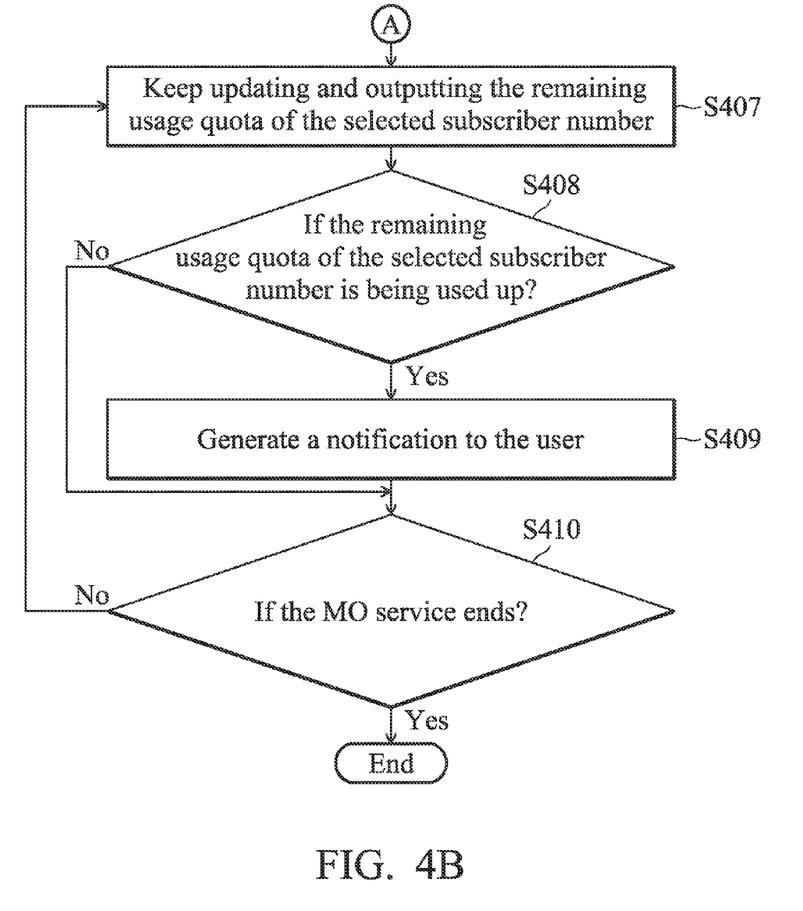

FIGS. 4A and 4B show a flow chart illustrating the method for selection among multiple subscriber numbers in a mobile communication device to start a Mobile Originated (MO) service according to an embodiment of the invention. In this embodiment, the mobile communication device is equipped with one or more subscriber identity cards for providing a plurality of subscriber numbers, such as the mobile communication device 110, and the method is performed by a processor of the mobile communication device, such as the processor 21 or 10'. To begin, the processor receives a request for starting an MO service (step S401). The MO service may be a CS service, e.g., voice service, VT call, or SMS, etc., or a PS service, e.g., e-mail transmission, web browsing, file upload/download, instant messaging, streaming video, or VOIP, etc. In cases where the MO service is a CS service, the request may be made by the user of the mobile communication device. In cases where the MO service is a PS service, the request may be made by an application which is executed in response to a user command or is automatically run in the background without user interaction.

Next, the processor determines a plurality of remaining usage quotas for the MO service, which correspond to a plurality of subscriber numbers (step S402). Specifically, the remaining usage quotas are determined according to a receiving subscriber number of the MO service. That is, it is at least required to identify the operator to which the receiving subscriber number belongs. In one embodiment, the operator of the receiving subscriber number may be identified by the first 4 or 5 digits of the receiving subscriber number without Number Portability (NP). In another embodiment, the operator of the receiving subscriber number may be identified by inquiring the operator customer service or by using existing applications, such as M+, or whoscall.

The remaining usage quotas indicate remaining anytime minutes (such as anytime minutes for voice calls and/or VT calls), remaining call credits (such as call credits for voice calls and/or VT calls), remaining SMS credits, or remaining PS service credits, or others, and the invention is not limited thereto. In one embodiment, a table or database may be used to keep the remaining usage quotas of the subscriber numbers, as shown below.

TABLE 1

| Subcriber number# | Operator | Billing cycle date | In-net anytime minutes/call credits | Out-net anytime minutes/call credits | Rates of service charges for PS services | PS service credits |
| --- | --- | --- | --- | --- | --- | --- |
| Subscriber number #01 | CHT | The 15th of each month | 200 NT dollars | 200 minutes | 5 NT dollars per MB | 5 GB |
| Subscriber number #02 | FET | The 3rd of each month | 200 minutes | 200 NT dollars | 10 NT dollars per MB | 3 GB |

The subscriber numbers #01 and #02 represent two individual phone numbers, and CHT and FET are short for Chunghwa Telecom and for EasTone Telecom in Taiwan.

The in-net anytime minutes or call credits indicate the number of minutes or credits for voice calls and/or VT calls, that are included in the service contracts for in-net calls (i.e., the calls made within the same service network), and the out-net anytime minutes or call credits indicate the number of minutes or credits for voice calls and/or VT calls, that are included in the service contracts for out-net calls (i.e., the calls made across different service networks). The aforementioned table or database may be initialized according to the service contracts of the subscriber numbers, and may be manually configured by the user of the mobile communication device or automatically configured by retrieving associated information from the servers of the operators that provide the subscriber numbers. It is to be understood that the table or database as shown in Table 1 may be modified to include more than two subscriber numbers, and the invention is not limited thereto.

In addition to the table or database as shown in Table 1, if any service contract of the subscriber numbers include a special discounts, such as special charging rules for the receiving subscriber numbers that are Mobile Virtual Private Network (MVPN) numbers or toll-free hotlines, another table or database may be used to keep the information of the special discounts, as shown below.

TABLE 2

| Sunscriber number # | Operator | Billing cycle date | MVPN numbers/toll-free hotlines | anytime minutes |
|---|---|---|---|---|
| Subscriber number #01 | CHT | The 15th of each month | MVPN number #01~N | Unlimited minutes |
| Subscriber number #02 | FET | The 3rd of each month | Toll-free hotline number #01~M | 2000 minutes |

Similar to the table or database shown in Table 1, the table or database as shown in Table 2 may be initialized according to the service contracts of the subscriber numbers, and may be manually configured by the user of the mobile communication device or automatically configured by retrieving associated information from the servers of the operators that provide the subscriber numbers. It is to be understood that the table or database as shown in Table 2 may be modified to include more than two subscriber numbers, and the invention is not limited thereto.

Furthermore, yet another table or database as shown below may be used to keep the information of the rates of service charges for voice calls.

TABLE 3

| Sunscriber number # | Operator | Time periods | In-net rates of service charges for voice calls | Out-net rates of service charges for voice calls |
|---|---|---|---|---|
| Subscriber number #01 | CHT | 09:00~23:00 | 0.06 NT dollars per second | 0.1 NT dollars per second |
| Subscriber number #01 | CHT | 23:00~09:00 | 0.05 NT dollars per second | 0.08 NT dollars per second |
| Subscriber number #02 | FET | 09:00~23:00 | 0.02 NT dollars per second | 0.11 NT dollars per second |
| Subscriber number #02 | FET | 23:00~09:00 | 0.02 NT dollars per second | 0.08 NT dollars per second |

It is to be understood that the table or database as shown in Table 3 may be modified to include more than two subscriber numbers or more than two time periods for each subscriber number, and the invention is not limited thereto.

Subsequent to step S402, it is determined whether at least one of the remaining usage quotas is positive (step S403), and if so, the processor selects the subscriber number with the corresponding remaining usage quota being the highest among the remaining usage quotas, or selects the subscriber number with the corresponding remaining usage quota being positive and with a corresponding rate of service charge being the lowest among all rates of service charges corresponding to the subscriber numbers for the MO service (step S404). For example, if the remaining usage quotas indicate remaining anytime minutes (such as anytime minutes for voice calls and/or VT calls), remaining SMS credits, or remaining PS service credits, etc., then the subscriber number may be selected with the highest remaining anytime minutes, remaining SMS credits, or remaining PS service credits, etc., depending on the type of the MO service. If the remaining usage quotas indicate remaining call credits (such as call credits for voice calls and/or VT calls), then the subscriber number may be selected with the lowest rate of service charge for the MO service. Subsequent to step S403, if none of the remaining usage quotas is positive, the processor selects the subscriber number with a corresponding rate of service charge being the lowest (i.e., the least expensive) among all rates of service charges corresponding to the subscriber numbers for the MO service (step S405). In other words, the processor selects one from the plurality of subscriber numbers according to the remaining usage quotas.

Subsequent to steps S404 and S405, the processor uses the selected subscriber number to start the MO service (step S406). In another embodiment, the processor may present the selected subscriber number and the remaining usage quotas determined in step S402 to the user, so that the user may decide whether or not to use the selected subscriber number or that he/she prefers another subscriber number based on the remaining usage quotas. During the MO service, the processor keeps updating the remaining usage quota of the selected subscriber number and outputting the updated remaining usage quota to the display unit of the mobile communication device (step S407). That is, the remaining usage quota stored in the table or database as shown in Table 1 is simultaneously updated during the MO service.

Subsequent to step S407, the processor determines whether the remaining usage quota of the selected subscriber number is being used up (step S408), and if so, the processor generates a notification to the user about the remaining usage quota of the selected subscriber number being used up (step S409). The notification may be a popup message on the display unit of the mobile communication device, or may be a beep in combination with a blinking visual effect on the displayed remaining usage quota. After that, it is determined whether the MO service ends (step S410), and if so, the method ends. Otherwise, if the MO service continues, the method returns to step S407.

In another embodiment, step S407 may be delayed to the end of the MO service. That is, the update of the remaining usage quota may be performed only once at the end of the MO service, for saving power consumption of the processor.

Figure 5A:
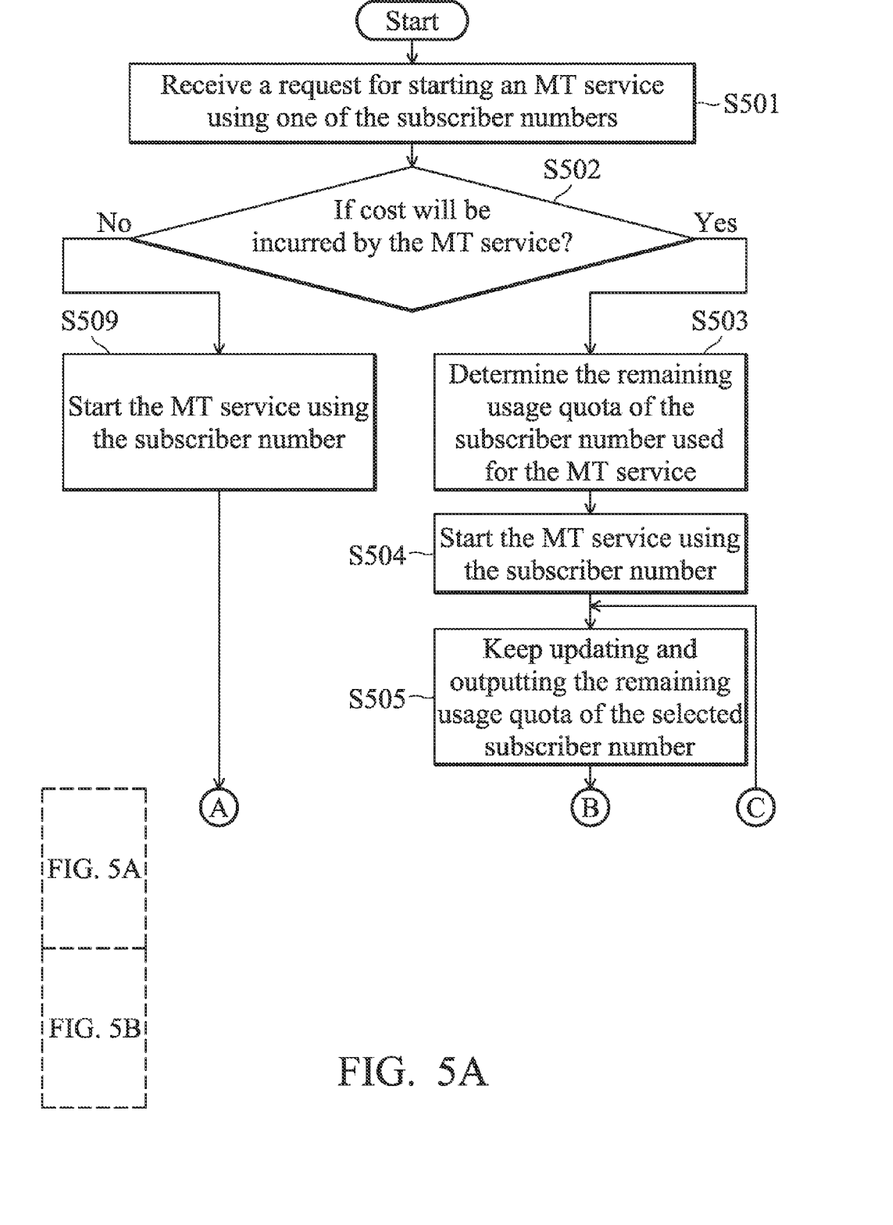
FIGS. 5A and 5B show a flow chart illustrating the method for selection among multiple subscriber numbers in a mobile communication device to start a Mobile Terminated (MT) service according to an embodiment of the invention.
Figure 5B:
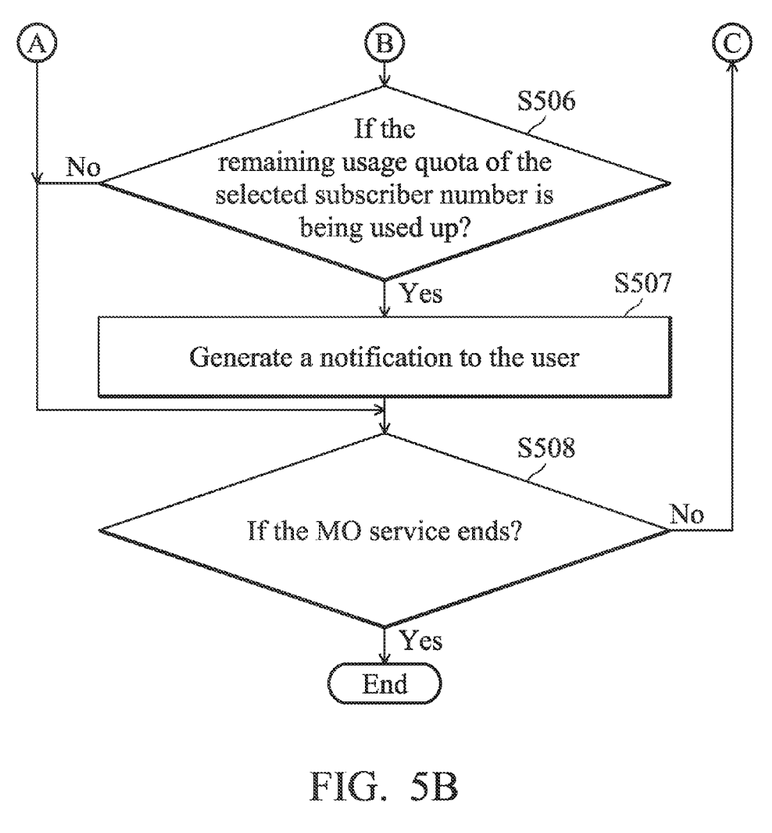

FIGS. 5A and 5B show a flow chart illustrating the method for selection among multiple subscriber numbers in a mobile communication device to start a Mobile Terminated (MT) service according to an embodiment of the invention.

In this embodiment, the mobile communication device is equipped with one or more subscriber identity cards for providing a plurality of subscriber numbers, such as the mobile communication device 110, and the method is performed by a processor of the mobile communication device, such as the processor 21 or 10'. To begin, the processor receives a request for starting an MT service using one of the subscriber numbers (step S501). The MT service may be a CS service, e.g., voice service, VT call, or SMS, etc., or may be a PS service, e.g., e-mail transmission, web browsing, file upload/download, instant messaging, streaming video, or VOIP, etc.

Next, the processor determines whether cost will be incurred by the MT service (step S502). Specifically, whether cost will be incurred by the MT service may be determined according to the service contract associated with the subscriber number. For example, in some countries, only the caller should bear the costs of native calls, and both the caller and the callee should bear the costs of roaming calls. Alternatively, in other countries, both the caller and the callee should bear the costs of either native calls or roaming calls.

Subsequent to step S502, if cost will be incurred by the MT service, the processor proceeds to determine the remaining usage quota of the subscriber number used for the MT service (step S503) and start the MT service using the subscriber number (step S504). Specifically, the remaining usage quota of the subscriber number may be determined by looking up the table or database as shown in Table 1.

During the MT service, the processor keeps updating the remaining usage quota of the subscriber number and outputting the updated remaining usage quota to the display unit of the mobile communication device (step S505). That is, the remaining usage quota stored in the table or database as shown in Table 1 is simultaneously updated during the MT service.

After that, the processor determines whether the remaining usage quota of the subscriber number is being used up (step S506), and if so, the processor generates a notification to the user about the remaining usage quota of the subscriber number being used up (step S507), and if not, the method flow proceeds to step S508. The notification may be a message popup on the display unit of the mobile communication device, or may be a beep in combination with a glittering visual effect on the displayed remaining usage quota. Subsequently, it is determined whether the MT service ends (step S508), and if so, the method ends. Otherwise, if the MT service continues, the method returns to step S505.

Subsequent to step S502, if no cost will be incurred by the MT service, the processor starts the MT service using the subscriber number (step S509), and the method flow goes to step S508.

Figure 6:
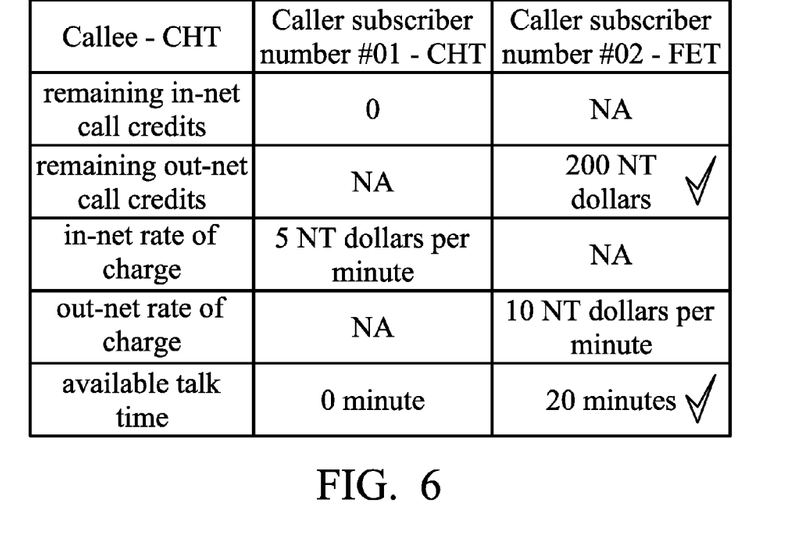
FIG. 6 is an exemplary diagram illustrating the selection of subscriber numbers for an MO call according to an embodiment of the invention.

FIG. 6 is an exemplary diagram illustrating the selection of subscriber numbers for an MO call according to an embodiment of the invention. In this embodiment, the operator of the receiving subscriber number, i.e., the callee, is CHT, and the caller has two subscriber numbers, wherein the operator of the caller's first subscriber number is CHT while the operator of the caller's second subscriber number is FET. That is, the callee is within the same service network as the caller's first subscriber number, and is not within the same service network as the caller's second subscriber number. As shown in FIG. 6, a comparison regarding the given callee between the caller's two subscriber numbers is depicted as a table, in which the remaining in-net call credits (such as call credits for voice calls and/or VT calls) and the in-net rate of service charge of the caller's first subscriber number are 0 and 5 NT dollars per minute, respectively, while the remaining out-net call credits (such as call credits for voice calls and/or VT calls) and the out-net rate of service charge of the caller's second subscriber number are 200 NT dollars and 10 NT dollars per minute, respectively. It is noted that, since the callee is within the same service network as the caller's first subscriber number, the remaining out-net call credits and the out-net rate of service charge of the caller's first subscriber number may be ignored and are denoted as NA (Not Applicable). Similarly, since the callee is not within the same service network as the caller's second subscriber number, the remaining in-net call credits and the in-net rate of service charge of the caller's second subscriber number may be ignored and are denoted as NA (Not Applicable).

In the table shown in FIG. 6, the remaining in-net call credits (for voice calls and/or VT calls) of the caller's first subscriber number and the remaining out-net call credits (for voice calls and/or VT calls) of the caller's second subscriber number are further converted into remaining in-net anytime minutes (for voice calls and/or VT calls) and remaining out-net anytime minutes (for voice calls and/or VT calls), i.e., 0 minute and 20 minutes, according to the in-net rate of service charge of the caller's first subscriber number and the out-net rate of service charge of the caller's second subscriber number. Thus, based on the anytime minutes, or the remaining in-net and out-net call credits (denoted with the check marks), it is determined to select the second subscriber number for making the MO call to the callee.

Figure 7:
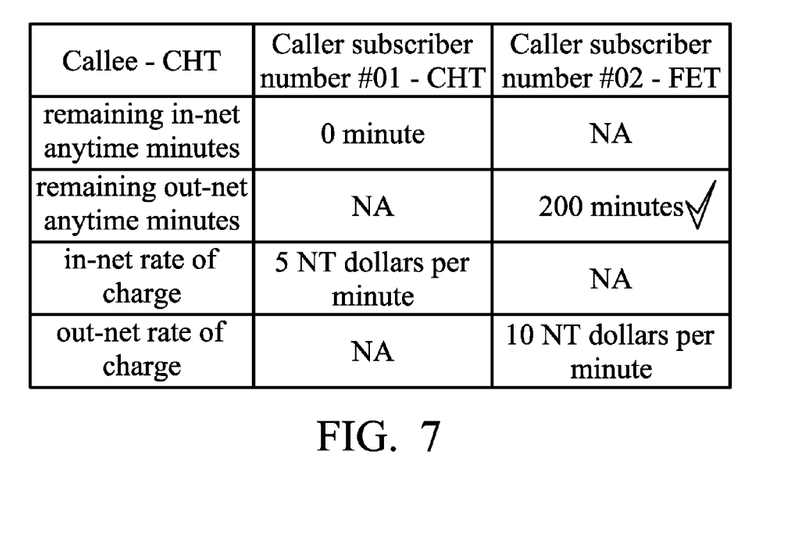
FIG. 7 is an exemplary diagram illustrating the selection of subscriber numbers for an MO call according to another embodiment of the invention.

FIG. 7 is an exemplary diagram illustrating the selection of subscriber numbers for an MO call according to another embodiment of the invention. Similar to the embodiment of FIG. 6, the operator of the receiving subscriber number, i.e., the callee, is CHT, and the operator of the caller's first subscriber number is CHT while the operator of the caller's second subscriber number is FET. That is, the callee is within the same service network as the caller's first subscriber number, and is not within the same service network as the caller's second subscriber number. As shown in FIG. 7, a comparison regarding the given callee between the caller's two subscriber numbers is depicted as a table, in which the remaining in-net anytime minutes (for voice calls and/or VT calls) and the in-net rate of service charge of the caller's first subscriber number are 0 minute and 5 NT dollars per minute, respectively, while the remaining out-net anytime minutes (for voice calls and/or VT calls) and the out-net rate of service charge of the caller's second subscriber number are 200 minutes and 10 NT dollars per minute, respectively. Thus, based on the remaining in-net and out-net anytime minutes (denoted with the check mark), it is determined to select the second subscriber number for making the MO call to the callee.

Figure 8:
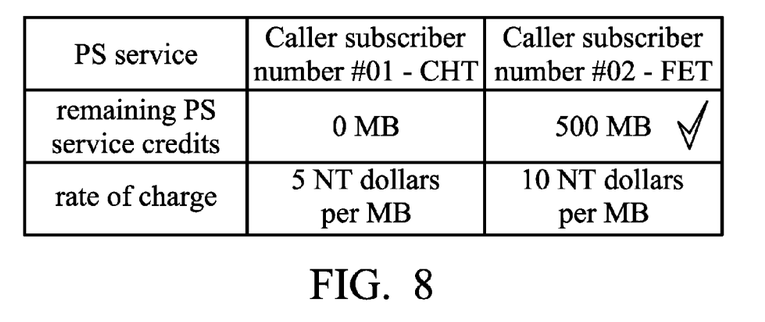
FIG. 8 is an exemplary diagram illustrating the selection of subscriber numbers for a PS service according to an embodiment of the invention.

FIG. 8 is an exemplary diagram illustrating the selection of subscriber numbers for a PS service according to an embodiment of the invention. As shown in FIG. 8, a comparison between the caller's two subscriber numbers is depicted as a table, in which the remaining PS service credits and the rate of service charge of the caller's first subscriber number are 0 Mega-Byte (MB) and 5 NT dollars per MB, respectively, while the remaining PS service credits and the rate of service charge of the caller's second subscriber number are 500 MB and 10 NT dollars per MB, respectively. Thus, based on the remaining PS service credits (denoted with the check mark), it is determined to select the second subscriber number for starting the PS service.

Figure 9:
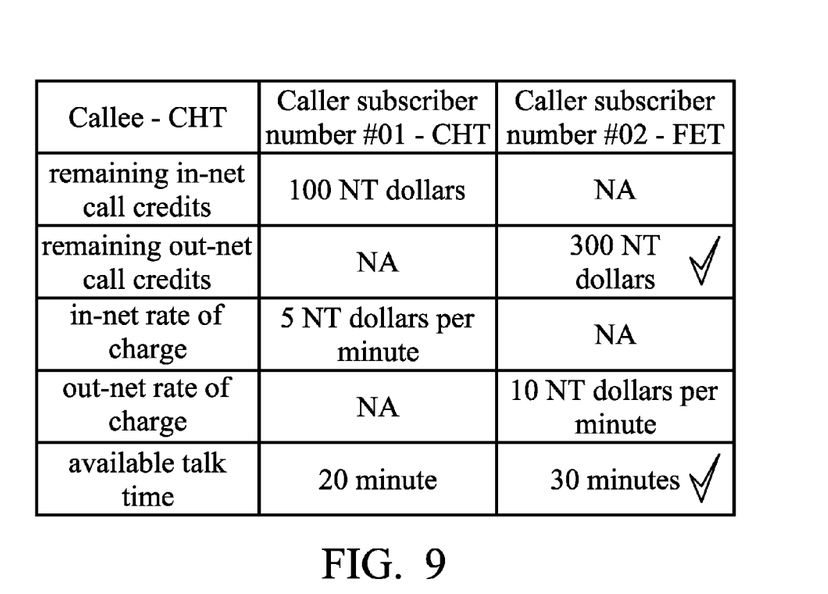
FIG. 9 is an exemplary diagram illustrating the selection of subscriber numbers for an MO call according to yet another embodiment of the invention.

FIG. 9 is an exemplary diagram illustrating the selection of subscriber numbers for an MO call according to yet another embodiment of the invention. Similar to the embodiment of FIG. 6, the operator of the receiving subscriber number, i.e., the callee, is CHT, and the operator of the caller's first subscriber number is CHT while the operator of the caller's second subscriber number is FET. That is, the callee is within the same service network as the caller's first subscriber number, and is not within the same service network as the caller's second subscriber number. As shown in FIG. 9, a comparison regarding the given callee between the caller's two subscriber numbers is depicted as a table, in which the remaining in-net call credits (such as call credits for voice calls and/or VT calls) and the in-net rate of service charge of the caller's first subscriber number are 100 NT dollars and 5 NT dollars per minute, respectively, while the remaining out-net call credits (such as call credits for voice calls and/or VT calls) and the out-net rate of service charge of the caller's second subscriber number are 300 NT dollars and 10 NT dollars per minute, respectively.

In the table shown in FIG. 9, the remaining in-net call credits of the caller's first subscriber number and the remaining out-net call credits of the caller's second subscriber number are further converted into remaining in-net anytime minutes (for voice calls and/or VT calls) and remaining out-net anytime minutes (for voice calls and/or VT calls), i.e., 20 minutes and 30 minutes, according to the in-net rate of service charge of the caller's first subscriber number and the out-net rate of service charge of the caller's second subscriber number. Thus, based on the anytime minutes, or the remaining in-net and out-net call credits (denoted with the check marks), it is determined to select the second subscriber number for making the MO call to the callee.

Figure 10:
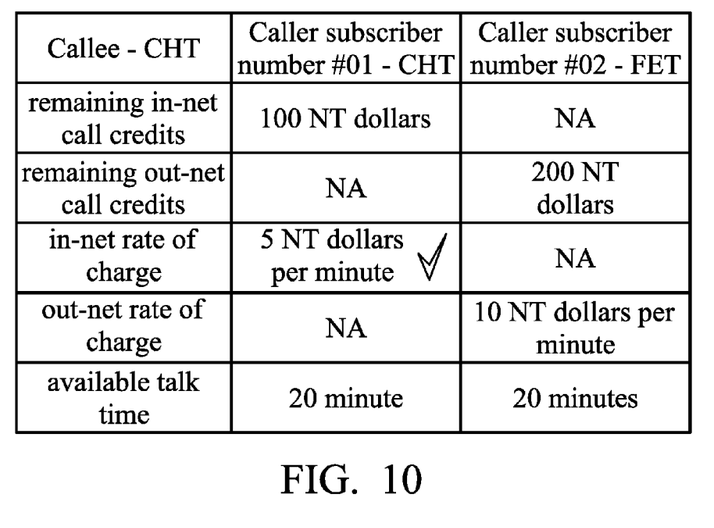
FIG. 10 is an exemplary diagram illustrating the selection of subscriber numbers for an MO call according to still another embodiment of the invention.

FIG. 10 is an exemplary diagram illustrating the selection of subscriber numbers for an MO call according to still another embodiment of the invention. Similar to the embodiment of FIG. 6, the operator of the receiving subscriber number, i.e., the callee, is CHT, and the operator of the caller's first subscriber number is CHT while the operator of the caller's second subscriber number is FET. That is, the callee is within the same service network as the caller's first subscriber number, and is not within the same service network as the caller's second subscriber number. As shown in FIG. 10, a comparison regarding the given callee between the caller's two subscriber numbers is depicted as a table, in which the remaining in-net call credits (such as call credits for voice calls and/or VT calls) and the in-net rate of service charge of the caller's first subscriber number are 100 NT dollars and 5 NT dollars per minute, respectively, while the remaining out-net call credits (such as call credits for voice calls and/or VT calls) and the out-net rate of service charge of the caller's second subscriber number are 200 NT dollars and 10 NT dollars per minute, respectively.

In the table shown in FIG. 10, the remaining in-net call credits of the caller's first subscriber number and the remaining out-net call credits of the caller's second subscriber number are further converted into remaining in-net anytime minutes (for voice calls and/or VT calls) and remaining out-net anytime minutes (for voice calls and/or VT calls), i.e., 20 minutes and 20 minutes, according to the in-net rate of service charge of the caller's first subscriber number and the out-net rate of service charge of the caller's second subscriber number. Due to the fact the first and second subscriber number have the same amount of remaining anytime minutes, it is determined to select the first subscriber number for making the MO call to the callee, based on the rate of service charge for the MO call (denoted with the check mark).

While the invention has been described by way of example and in terms of preferred embodiment, it is to be understood that the invention is not limited thereto. Those who are skilled in this technology can still make various alterations and modifications without departing from the scope and spirit of this invention. For example, the method of FIGS. 4A, 4B, 5A, and 5B may be implemented in program code stored in a machine-readable storage medium, such as a magnetic tape, semiconductor, magnetic disk, optical disc (e.g., CD-ROM, DVD-ROM, etc.), or others, which is loaded and executed by the processor of the mobile communication device. Therefore, the scope of the present invention shall be defined and protected by the following claims and their equivalents.

What is claimed is:

1. A mobile communication device, comprising:
a processor configured to receive a request for starting a Mobile Originated (MO) service, determine a plurality of remaining usage quotas for the MO service, which correspond to a plurality of subscriber numbers, and select one of the subscriber numbers for starting the MO service according to the remaining usage quotas,
wherein, when at least one of the remaining usage quotas is positive, the one of the subscriber numbers used for starting the MO service is selected with the corresponding remaining usage quota being the highest among the remaining usage quotas, or is selected with the corresponding remaining usage quota being positive and with a corresponding rate of service charge being the lowest among all rates of service charges corresponding to the subscriber numbers for the MO service; and
wherein, when none of the remaining usage quotas is positive, the one of the subscriber numbers used for starting the MO service is selected with a corresponding rate of service charge being the lowest among all rates of service charges corresponding to the subscriber numbers for the MO service.

2. The mobile communication device of claim 1, wherein the remaining usage quotas are determined according to a receiving subscriber number of the MO service.

3. The mobile communication device of claim 1, wherein the remaining usage quotas indicate remaining anytime minutes for voice calls or Video-Telephony (VT) calls, remaining call credits for voice calls or VT calls, remaining Short Message Service (SMS) credits, or remaining Packet-Switched (PS) service credits.

4. The mobile communication device of claim 1, wherein the processor further updates the corresponding remaining usage quota of the one of the subscriber identity cards during the MO service or upon ending the MO service.

5. The mobile communication device of claim 1, wherein the processor further notifies a user of the mobile communication device when the corresponding remaining usage quota of the one of the subscriber numbers is being used up during the MO service.

6. The mobile communication device of claim 1, wherein the processor further receives a request for starting a Mobile Terminated (MT) service using the one or another of the subscriber numbers, and updates the corresponding remaining usage quota of the one or the other of the subscriber numbers during the MT service or upon ending the MT service.

7. A method for selection among multiple subscriber numbers in a mobile communication device, comprising:
receiving a request for starting a Mobile Originated (MO) service;

determining a plurality of remaining usage quotas for the MO service, which correspond to a plurality of subscriber numbers; and selecting one of the subscriber numbers for starting the MO service according to the remaining usage quotas, wherein, when at least one of the remaining usage quotas is positive, the one of the subscriber numbers used for starting the MO service is selected with the corresponding remaining usage quota being the highest among the remaining usage quotas, or is selected with the corresponding remaining usage quota being positive and with a corresponding rate of service charge being the lowest among all rates of service charges corresponding to the subscriber numbers for the MO service; and wherein, when none of the remaining usage quotas is positive, the one of the subscriber numbers used for starting the MO service is selected with a corresponding rate of service charge being the lowest among all rates of service charges corresponding to the subscriber numbers for the MO service.

8. The method of claim 7, wherein the remaining usage quotas are determined according to a receiving subscriber number of the MO service.

9. The method of claim 7, wherein the remaining usage quotas indicate remaining anytime minutes for voice calls or Video-Telephony (VT) calls, remaining call credits for voice calls or VT calls, remaining Short Message Service (SMS) credits, or remaining Packet-Switched (PS) service credits.

10. The method of claim 7, further comprising:

updating the corresponding remaining usage quota of the one of the subscriber numbers during the MO service or upon ending the MO service.

11. The method of claim 7, further comprising:

notifying a user of the mobile communication device when the corresponding remaining usage quota of the one of the subscriber numbers is being used up during the MO service.

12. The method of claim 7, further comprising:

receiving a request for starting a Mobile Terminated (MT) service using the one or another of the subscriber numbers; and updating the corresponding remaining usage quota of the one or the other of the subscriber numbers during the MT service or upon ending the MT service.

* * * * *